United States Patent
Krüger (10) Patent No.: US 10,551,091 B2
(45) Date of Patent: Feb. 4, 2020

(54) GEOTHERMAL ENERGY EXTRACTION SUBTERRANEAN SYSTEM

(71) Applicant: Welltec Oilfield Solutions AG, Zug (CH)

(72) Inventor: Christian Krüger, Allerød (DK)

(73) Assignee: Welltec Oilfield Solutions AG, Zug (CH)

(*) Notice: Subject to any disclaimer, the term of this patent is extended or adjusted under 35 U.S.C. 154(b) by 17 days.

(21) Appl. No.: 15/588,981

(22) Filed: May 8, 2017

(65) Prior Publication Data
US 2017/0321934 A1 Nov. 9, 2017

(30) Foreign Application Priority Data
May 9, 2016 (EP) .................................... 16168813

(51) Int. Cl.
*E21B 33/127* (2006.01)
*E21B 34/06* (2006.01)
*E21B 43/26* (2006.01)
*E21B 43/30* (2006.01)
*E21B 47/06* (2012.01)
(Continued)

(52) U.S. Cl.
CPC ............ *F24T 10/17* (2018.05); *E21B 33/127* (2013.01); *E21B 34/06* (2013.01); *E21B 43/26* (2013.01); *E21B 43/305* (2013.01); *E21B 47/06* (2013.01); *F24T 10/20* (2018.05); *E21B 2034/007* (2013.01); *F24F 2005/0053* (2013.01);
(Continued)

(58) Field of Classification Search
CPC ... F24F 2005/0053; F24T 10/20; F24T 10/17; E21B 33/127; E21B 33/1277; E21B 34/06; Y02E 10/125; Y02E 10/14

USPC .............................................. 165/45; 166/387
See application file for complete search history.

(56) References Cited

U.S. PATENT DOCUMENTS 3,863,709 A * 2/1975 Fitch .................... E21B 43/17
165/45
3,878,884 A * 4/1975 Raleigh ................ E21B 43/17
165/45

(Continued)

FOREIGN PATENT DOCUMENTS

WO    WO 2011/049673    4/2011

OTHER PUBLICATIONS

Extended EP Search Report for EP16168813.0 dated Nov. 3, 2016, 9 pages.

Primary Examiner — Joel M Attey
(74) Attorney, Agent, or Firm — Nixon & Vanderhye P.C.

(57) ABSTRACT

A geothermal energy extraction subterranean system for extracting heat from a subterranean formation has an injection well in a first borehole and a first production well extracting the heated working fluid through a first production opening. The first well tubular metal structure has first and second annular barriers to isolate a production zone, each annular barrier including a tubular metal part having a first expansion opening and an outer face, an expandable metal sleeve surrounding the tubular metal part and having an inner face facing the tubular metal part and an outer face facing the wall, each end of the expandable metal sleeve being connected with the tubular metal part. The first production zone is arranged between the first and second well tubular metal structures so that the heated working fluid is extracted in the second well tubular metal structure through the first production opening.

20 Claims, 10 Drawing Sheets

(51) Int. Cl.
  *E21B 34/00*  (2006.01)
  *F24T 10/17*  (2018.01)
  *F24T 10/20*  (2018.01)
  *F24F 5/00*  (2006.01)
  *F24T 10/00*  (2018.01)

(52) U.S. Cl.
  CPC ......... *F24T 2010/56* (2018.05); *Y02E 10/125* (2013.01); *Y02E 10/14* (2013.01)

(56) References Cited

U.S. PATENT DOCUMENTS

| | | | | |
|---|---|---|---|---|
| 4,223,729 | A * | 9/1980 | Foster | E21B 43/17 |
| | | | | 166/271 |
| 4,403,660 | A * | 9/1983 | Coone | E21B 33/128 |
| | | | | 166/179 |
| 2004/0123983 | A1* | 7/2004 | Cook | E21B 33/10 |
| | | | | 166/50 |
| 2010/0307756 | A1* | 12/2010 | Jung et al. | E21B 43/17 |
| | | | | 166/308.1 |
| 2012/0090858 | A1* | 4/2012 | Ingram | E21B 23/06 |
| | | | | 166/387 |
| 2014/0190708 | A1* | 7/2014 | Hallundbaek | E21B 17/00 |
| | | | | 166/382 |
| 2015/0300327 | A1* | 10/2015 | Sweatman | E21B 43/25 |
| | | | | 60/641.2 |

\* cited by examiner

GEOTHERMAL ENERGY EXTRACTION SUBTERRANEAN SYSTEM

This application claims priority to EP Patent Application No. 16168813.0 filed May 9, 2016, the entire content of which is hereby incorporated by reference.

The present invention relates to a geothermal energy extraction subterranean system for extracting heat from a subterranean formation. The invention also relates to a geothermal energy extraction subterranean method for extracting heat from a subterranean formation by means of the geothermal energy extraction subterranean system according to the present invention.

In a geothermal system, working fluid is injected into the subterranean formation and the heated working fluid extracted from a production well is subsequently used to provide heated fluid to the community or the heated working fluid is converted to electricity. In order to heat the working fluid, fractures are made in the formation, so that the working fluid can flow through the formation and be heated by heated formation. However, when making such fractures, seismic activity most often occurs which in some cases may prevent further fracturing and may even close the geothermal system.

It is an object of the present invention to wholly or partly overcome the above disadvantages and drawbacks of the prior art. More specifically, it is an object to provide an improved geothermal system in which seismic activity is minimised to an activity level below an acceptable level, if not fully avoided.

The above objects, together with numerous other objects, advantages and features, which will become evident from the below description, are accomplished by a solution in accordance with the present invention by a geothermal energy extraction subterranean system for extracting heat from a subterranean formation, comprising:

- an injection well comprising a first well tubular metal structure arranged in a first borehole providing a first annulus therebetween and extending from surface into the subterranean formation and being configured to inject a working fluid out through a first injection opening into a production area defined in the subterranean formation and thereby generating a heated working fluid, and
- a first production well comprising a second well tubular metal structure arranged in a second borehole providing a second annulus therebetween and extending from surface into the subterranean formation into the production area and extracting the heated working fluid through a first production opening, wherein the first well tubular metal structure of the injection well comprises a first annular barrier and a second annular barrier configured to expand in the first annulus to abut a wall of the first borehole to isolate a production zone in the production area, each annular barrier comprising:
  - a tubular metal part mounted as part of the first well tubular metal structure, the tubular metal part having a first expansion opening and an outer face,
  - an expandable metal sleeve surrounding the tubular metal part and having an inner face facing the tubular metal part and an outer face facing the wall of the borehole, each end of the expandable metal sleeve being connected with the tubular metal part, and
  - an annular space between the inner face of the expandable metal sleeve and the tubular metal part, the expandable metal sleeve being expanded to abut a wall of the first borehole by entering pressurised fluid into the annular space through the first expansion opening, the first injection opening being arranged in the first well tubular metal structure between the first annular barrier and the second annular barrier, and the first production zone being arranged between the first well tubular metal structure and the second well tubular metal structure so that the heated working fluid is extracted in the second well tubular metal structure through the first production opening.

The expandable metal sleeve may be plastically deformed during expansion.

Also, the expandable metal sleeve may not be re-usable.

By having the annular barriers abutting the borehole wall, the production zones are isolated substantially simultaneously with a simple solution by pressurising the well tubular metal structure and expanding the expandable metal sleeve without the use of a tool.

In some prior art solutions, the annulus between the well tubular metal structure and the wall of the borehole is cemented and subsequently fractures are made by isolating a section within the well tubular metal structure and pressurising the section to make fractures out through the cement. This is an operation requiring a very high pressure to be able to also fracture the cement, and the process is time-consuming as it takes some time to build up the pressure in the section and then depressurise to move the tool to the next section for pressurising that section and so forth. Furthermore, a cement operation is also time-consuming and not without risk of not filling up the whole annulus and thus the risk of not sufficiently sealing the annulus. If the cement operation fails, the fracturing process is in great risk of not being successful, and then the whole well must be plugged and abandoned. By using the present solution with annular barriers expanded in one run, there is no risk of a failing cement job and thus an unsuccessful fracturing. If one annular barrier fails to expand, the annular barrier can be expanded separately with a tool. Furthermore, the fracturing process is not requiring energy to also fracture cement as the present solution is cement free.

The geothermal energy extraction subterranean system of the present invention is a metal system, which conducts heat very easily and does not deteriorate over time compared to rubber, cement, elastomer or polymeric materials.

The geothermal energy extraction subterranean system may be fluidly connected with a district heating system at surface.

Also, the geothermal energy extraction subterranean system may be fluidly connected with a heat to electricity generating plant.

Furthermore, the second well tubular metal structure may comprise a first annular barrier and a second annular barrier.

The geothermal energy extraction subterranean system as described above may comprise a second production well having a second well tubular metal structure and a first production opening.

Moreover, the first well tubular metal structure may comprise additional annular barriers isolating a second production zone in the production area.

Also, the first well tubular metal structure may have an inner diameter which is larger than that of the second well tubular metal structure.

Additionally, the injection well and the production well may have a vertical part and a horizontal part.

Furthermore, the production well may be arranged at a predetermined distance from the injection well.

The first well tubular metal structure and/or the second well tubular metal structure may comprise at least one flow control device.

By having flow control devices, one flow control can be open at a time when fracturing the production zone and in this way the fracturing pressure can be kept significantly low so that severe seismic activity is avoided in that the fracturing process only occurs through one injection opening and/or through one production opening at a time.

The geothermal energy extraction subterranean system as described above may further comprise a pump controlling a pressure of the working fluid in the first well tubular metal structure.

Thus, the pump may control the velocity of the working fluid flowing in the subterranean system.

The geothermal energy extraction subterranean system as described above may further comprise means for regulating the flow control devices in order to selectively heat fluid in each production zone so that only a part of the production zones is in use at a time.

Furthermore, the injection well and/or the production well may further comprise one or more laterals extending from a main part of the well, the lateral comprises a lateral well tubular metal structure fluidly connected with the well tubular metal structure in the main part of the well.

Also, the system may comprise the injection well and several production wells surrounding the injection well.

Moreover, the injection well and the production well(s) may comprise several laterals at different depth in the subterranean formation.

In addition, the injection well and the production well(s) may comprise several laterals at different positions along an extension of the first well tubular metal structure and the second well tubular metal structure.

Also, the second well tubular metal structure may comprise a screen configured to filtrate the heated working fluid before entering the second well tubular metal structure.

The annular barrier may comprise an expansion unit.

Furthermore, the expansion unit may have a first inlet in fluid communication with the expansion opening, a second inlet in fluid communication with the first zone and an outlet in fluid communication with the annular space, and the expansion unit may comprise an element movable at least between a first position and a second position, in the first position the expansion opening being in fluid communication with the outlet and the tubular pressure being higher than the first pressure, and in the second position the outlet being in fluid communication with the first zone and the first pressure being higher than the tubular pressure.

Moreover, the tubular metal part may comprise at least one second expansion opening being fluidly connected with the first inlet.

The expansion unit may comprise a shuttle valve and the element may be comprised in the shuttle valve.

Also, the expansion unit may comprise a two-way valve in fluid communication with the expansion opening for controlling the fluid into and out of the annular space.

Furthermore, the annular barrier may comprise a second expandable metal sleeve in the annular space dividing the annular space in a first space part and a second space part, the first space part being in fluid communication with the expansion opening and the second space part being in fluid communication with the annulus.

In addition, the well tubular metal structure may comprise several openings in fluid communication with the same production zone.

The present invention also relates to a geothermal energy extraction subterranean method for extracting heat from a subterranean formation by means of the geothermal energy extraction subterranean system as described above, comprising:

pressurising the first well tubular metal structure of the injection well to expand the annular barriers, providing fluid communication through an injection opening in the first well tubular metal structure, fracturing the production zone by pressurising a fracturing fluid, such as a fluid present in the first well tubular metal structure or a fracturing fluid, in the first well tubular metal structure, introducing working fluid into the first well tubular metal structure of the injection well and further into the production zone, and extracting heated working fluid from the production zone.

Also, before providing fluid communication through the injection opening in the first well tubular metal structure, the first well tubular metal structure may be perforated providing the injection opening.

Furthermore, before providing fluid communication through the injection opening in the first well tubular metal structure, the injection opening may be opened, e.g. by sliding a sliding sleeve away from covering the injection opening.

The geothermal energy extraction subterranean method as described above, wherein the second well tubular metal structure may comprise a first annular barrier, may further comprise pressurising the second well tubular metal structure in order to expand the annular barriers of the second well tubular metal structure.

Furthermore, before pressurising the second well tubular metal structure in order to expand the annular barriers, the second well tubular metal structure may be perforated providing a production opening.

Also, before pressurising the second well tubular metal structure in order to expand the annular barriers, a production opening of the second well tubular metal structure may be opened, e.g. by sliding a sliding sleeve away from covering the production opening.

The geothermal energy extraction subterranean method as described above may further comprise fracturing the production zone by pressurising fluid in the second well tubular metal structure.

The geothermal energy extraction subterranean method as described above may further comprise stopping fracturing the production zone from the first well tubular metal structure during the fracturing from the second well tubular metal structure.

The geothermal energy extraction subterranean method as described above may further comprise detecting a pressure difference in the first well tubular metal structure during fracturing of the production zone from the second well tubular metal structure.

Furthermore, the geothermal energy extraction subterranean method as described above may further comprise closing a first injection opening and opening a second injection opening.

Moreover, the geothermal energy extraction subterranean method as described above may further comprise fracturing through the second injection opening.

Finally, the geothermal energy extraction subterranean method as described above may further comprise perforating the first well tubular metal structure and/or the second well tubular metal structure.

The invention and its many advantages will be described in more detail below with reference to the accompanying schematic drawings, which for the purpose of illustration show some non-limiting embodiments and in which.

All the figures are highly schematic and not necessarily to scale, and they show only those parts which are necessary in order to elucidate the invention, other parts being omitted or merely suggested.

Figure 1:
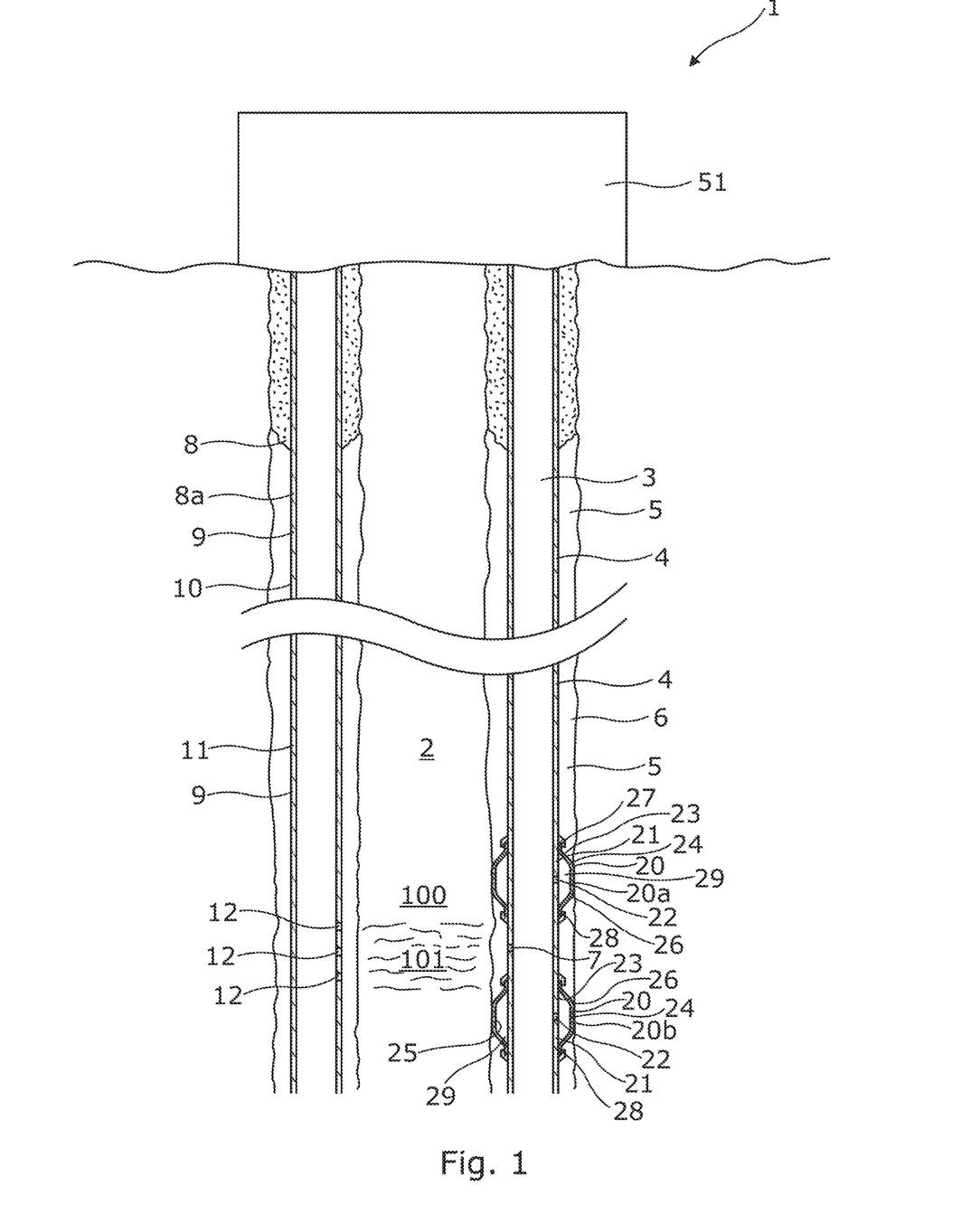
FIG. 1 shows a partly cross-sectional view of a geothermal energy extraction subterranean system.

FIG. 1 shows a geothermal energy extraction subterranean system 1 for extracting heat from a subterranean formation 2 in a production area 100 having one or more production zones 101. The geothermal energy extraction subterranean system comprises an injection well 3 comprising a first well tubular metal structure 4 arranged in a first borehole 5 providing a first annulus 6 between the wall of the first borehole 5 and the first well tubular metal structure 4. The injection well 3 extends from surface into the subterranean formation and is configured to inject a working fluid out through a first injection opening 7 into the production zone 101 of the production area 100 defined in the subterranean formation and thereby generating a heated working fluid which then enters into a first production well 8, 8a. The first production well 8 comprises a second well tubular metal structure 9 arranged in a second borehole 10 providing a second annulus 11 between the second well tubular metal structure 9 and the wall of the second borehole 10. The production well 8 extends from surface into the subterranean formation into the production area and is configured to extract the heated working fluid through a first production opening 12. The first well tubular metal structure of the injection well comprises a first annular barrier 20, 20a and a second annular barrier 20, 20b configured to expand to abut a wall of the borehole in the first annulus to isolate a production zone 101 in the production area. Each annular barrier comprises a tubular metal part 21 mounted as part of the first well tubular metal structure, and the tubular metal part has a first expansion opening 22 and an outer face 23. The annular barrier further comprises an expandable metal sleeve 24 surrounding the tubular metal part and having an inner face 25 facing the tubular metal part and an outer face 26 facing and abutting a wall of the first borehole. The expandable metal sleeves are thus plastically deformed and permanently installed in the borehole and cannot be retrieved and reused and thus cannot be deflated and re-expanded at another location in the well. Each end 27, 28 of the expandable metal sleeve is connected with the tubular metal part defining an annular space 29 between the inner face of the expandable metal sleeve and the tubular metal part. The expandable metal sleeve 24 is configured to expand by entering pressurised fluid into the annular space through the first expansion opening 22. The first injection opening is arranged in the first well tubular metal structure between the first annular barrier 20, 20a and the second annular barrier 20, 20b, and the first production zone is arranged between the first well tubular metal structure 4 and the second well tubular metal structure 9, so that the working fluid is heated in the formation as the fluid flows in fractures and the heated working fluid is extracted in the second well tubular metal structure through the first production opening. The geothermal energy extraction subterranean system is at surface fluidly connected with a district heating system 51a (shown in FIG. 1) for distributing heated fluid to end users and/or a heat to electricity generating plant 51b (shown in FIG. 2) for transforming heat into electricity.

By having first and second annular barriers, the fracturing process can be performed using less pressure in the fracturing fluid, and thus the fracturing is performed in a more direct way as the fracturing fluid is directed towards the formation in that zone only. Furthermore, one production zone at a time can be fractured instead of fracturing all zones at the same time. By fracturing by means of a substantially lower fracturing pressure of the fracturing fluid, only the formation in the production zone between the first borehole and the second borehole is fractured as opposed to what is the case in prior art systems in which the fracturing process results in a substantially larger fracturing area in other directions than only towards the production well. This induces a considerably higher risk of seismic activity and the formation also becomes substantially more damaged and the risk of the formation collapsing is increased.

In some prior art solutions, the annulus between the well tubular metal structure and the wall of the borehole are cemented, and subsequently fractures are made by isolating a section within the well tubular metal structure and pressurising the section to make fractures out through the cement. This is an operation requiring a very high pressure to be able to also fracture the cement, and the process is time-consuming as it takes some time to build up the pressure in the section and then depressurise to move the tool to the next section for pressurising that section and so forth. Furthermore, a cement operation is also time-consuming and not without risk of not filling up the whole annulus and thus the risk of not sufficiently sealing the annulus. If the cement operation fails, the fracturing process is in great risk of not being successful and then the whole well must be plugged and abandoned. By using the present solution with annular barriers expanded in one run, there is no risk of a failing cement job and thus an unsuccessful fracturing. If one annular barrier fails to expand, the annular barrier can be expanded separately with a tool. Furthermore, the fracturing process is not requiring energy to also fracture the cement as the present solution is cement free. Thus, by having a cement-less solution, the fracturing pressure of the present invention is lower than compared to prior art solutions using cement, and thus the cement solutions are in an even greater risk of generating too much seismic activity.

The geothermal energy extraction subterranean system of the present invention is a metal system which conducts heat very easily and does not deteriorate over time compared to rubber, cement, elastomer or polymeric materials.

By having the annular barriers abutting the borehole wall, the production zones are isolated substantially simultaneously with a simple solution by pressurising the well tubular metal structure and expanding the expandable metal sleeves of the annular barriers substantially simultaneously without the use of a tool. The production and/or injection openings may subsequently be opened or made by perforation.

The annular barriers are arranged externally of the well tubular metal structure and thus centre the well tubular metal structure in the borehole.

Figure 2:
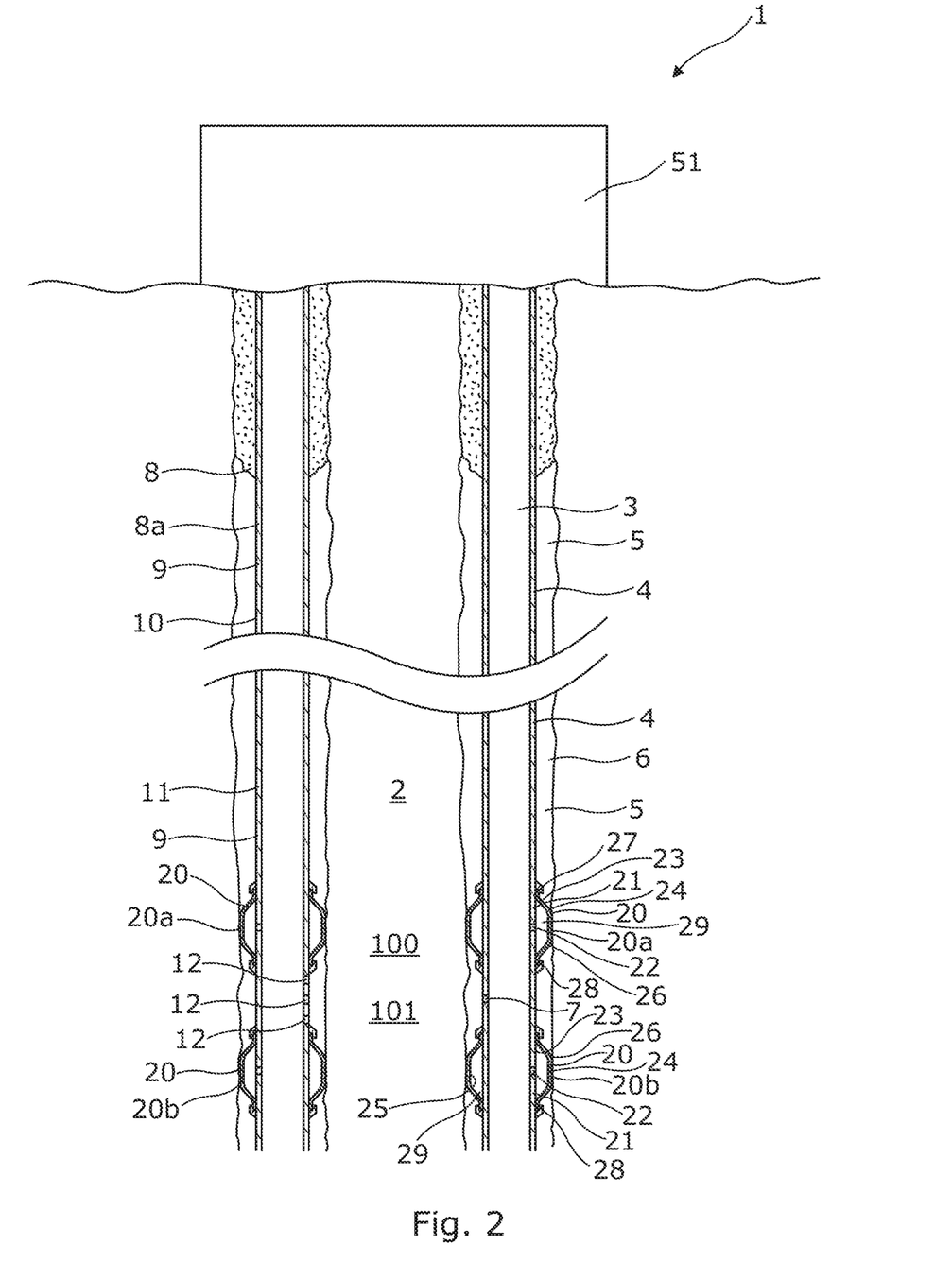
FIG. 2 shows a partly cross-sectional view of another geothermal energy extraction subterranean system.

In FIG. 2, the second well tubular metal structure of the geothermal energy extraction subterranean system comprises a first annular barrier 20, 20a and a second annular barrier 20, 20b. The fracturing process may then also be performed partly from the production well, e.g. simultaneously with or after fracturing from the injection well. By fracturing from both the injection well 3 and from the production well 8, the fracturing process can be even more "gentle" as the fracturing can be targeted directly towards the other well. Compared to other known solutions, only a substantially smaller zone is fractured since the fracturing pressure can be even lower as the fracturing fluid only has to travel half the way through the formation/production zone, and thus the pressure can be significantly reduced compared to fracturing performed merely from the injection well alone.

Figure 3:
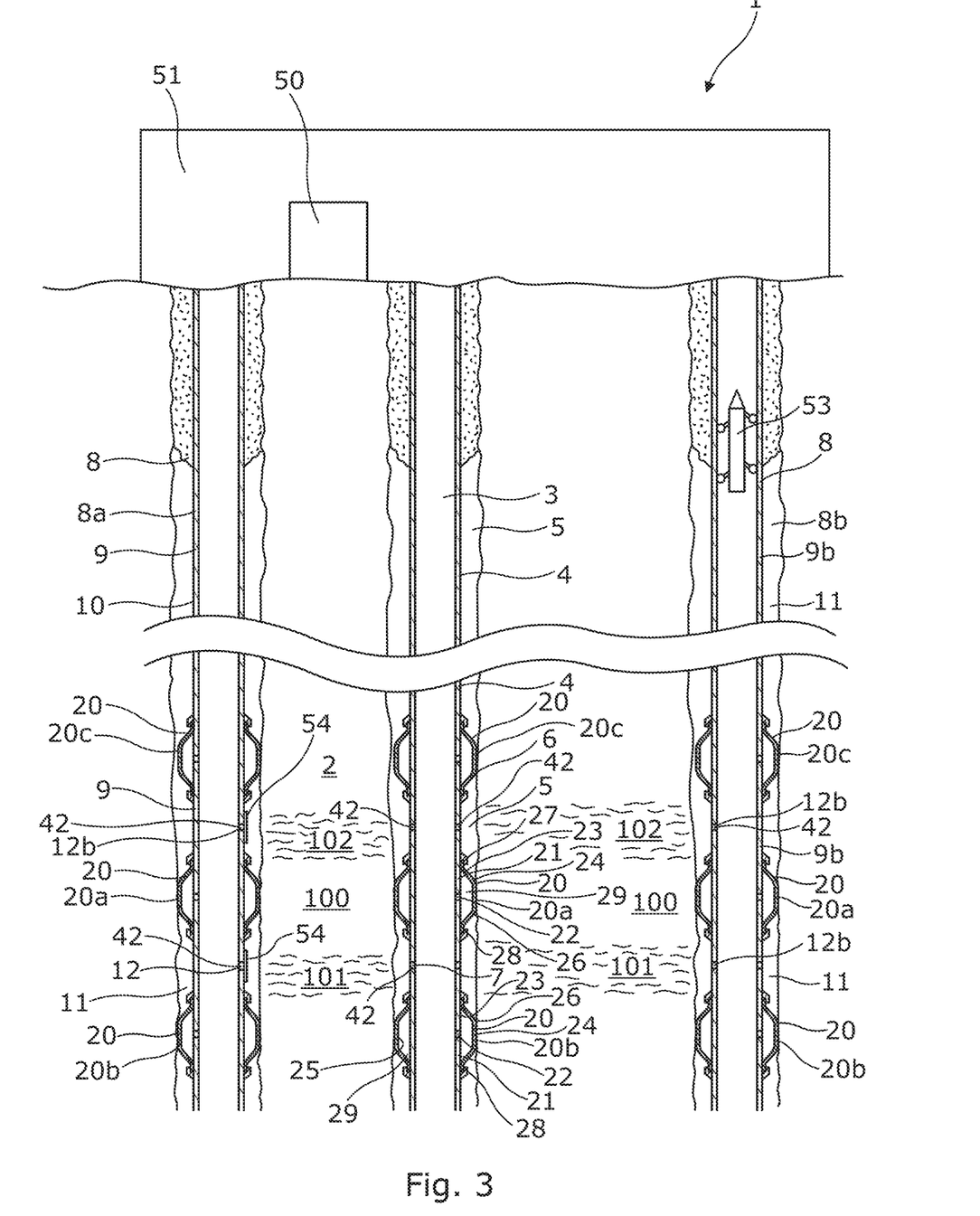
FIG. 3 shows a partly cross-sectional view of yet another geothermal energy extraction subterranean system.
Figure 5:
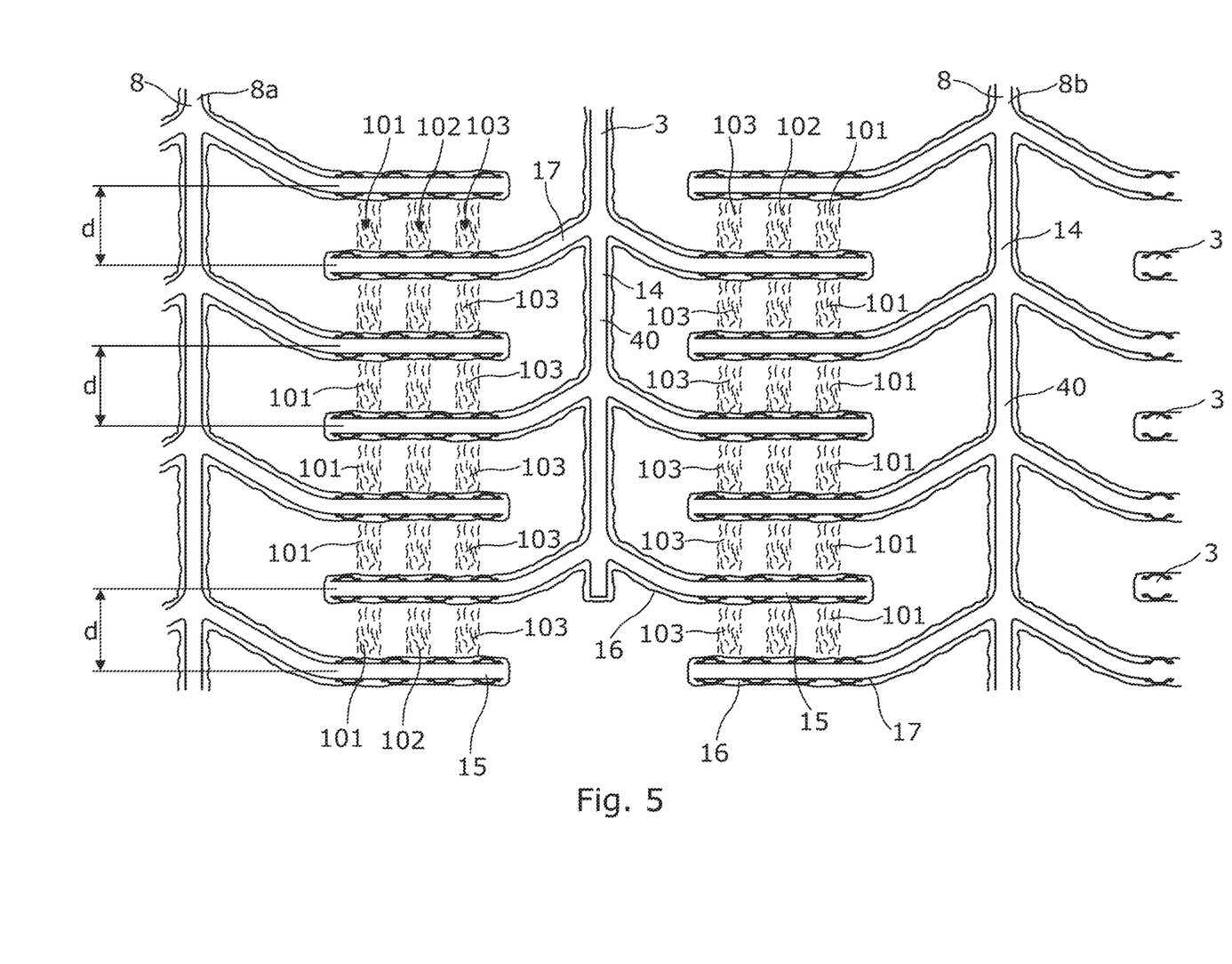
FIG. 5 shows a partly cross-sectional view of the geothermal energy extraction subterranean system shown in FIG. 4.

In FIG. 3, the geothermal energy extraction subterranean system comprises a second production well 8b having a second well tubular metal structure 9b and a first production opening 12b. In this way, one injection well is used to inject working fluid towards two production wells which increases the production of heated working fluid substantially. Thus, the production area is larger than in the system of FIG. 1. As can be seen, the well tubular metal structure comprises second annular barriers 20, 20c isolating a second production zone 102 in the production area. In this way, each of the well tubular metal structures may comprise a plurality of annular barriers configured to isolate several production zones 101, 102, 103 as shown in FIG. 5. In FIG. 5, the injection well 3 is arranged between the first production well 8a and the second production well 8b. The injection well and the production wells have a vertical part 14 and a horizontal part 15. Each injection well and/or the production well further comprise(s) one or more laterals 16 extending from a main part 40 of the well, and the lateral comprises a lateral well tubular metal structure 17 fluidly connected with the well tubular metal structure in the main part 40 of the well. The laterals of the injection well and the production well(s) are provided at different depths in the subterranean formation so that the production area has a larger extension in the vertical direction than compared to the system of FIG. 3.

Figure 4:
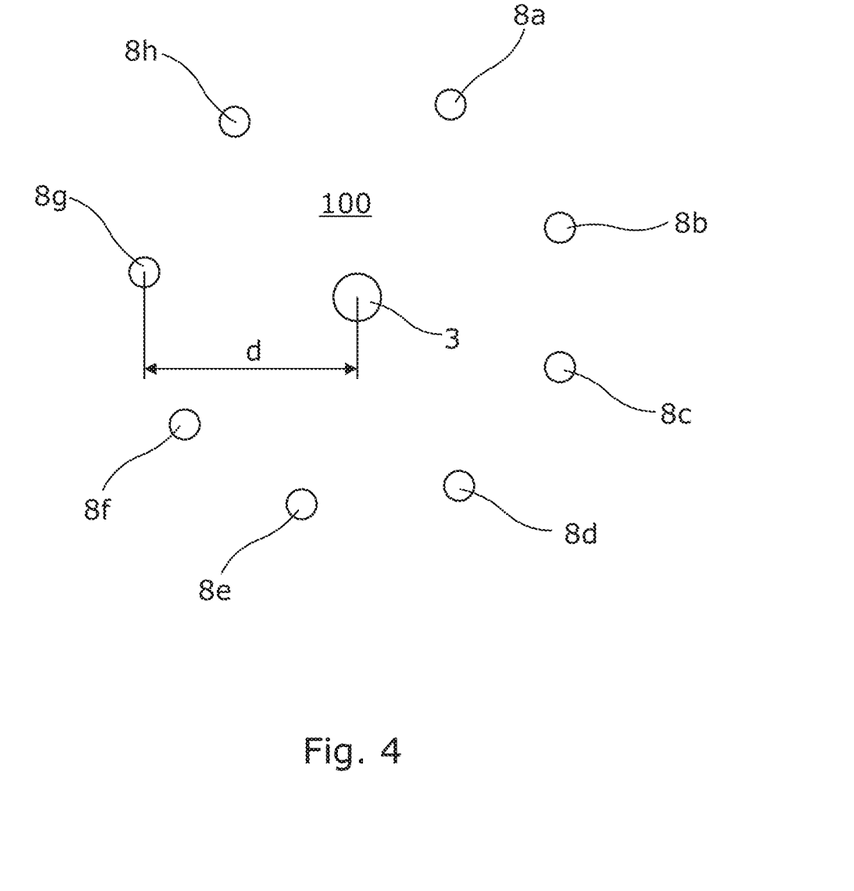
FIG. 4 shows a view of a geothermal energy extraction subterranean system seen from above.

In FIG. 4, the system comprises one injection well 3 and several production wells 8 surrounding the injection well. When having a geothermal energy extraction subterranean system comprising one injection well and several production wells, the first well tubular metal structure has an inner diameter which is larger than that of the second well tubular metal structure, as shown in FIG. 4. As shown in FIGS. 4 and 5, the production well 8 is arranged at a predetermined distance from the injection well 3. However, in FIG. 5, the system comprises several injection wells and several production wells.

As shown in FIG. 3, the first well tubular metal structure and/or the second well tubular metal structure may comprise a flow control device 42. By having flow control devices 42, one flow control device 42 can be open at a time when fracturing the production zone and in this way, the fracturing pressure can be kept significantly low to avoid severe seismic activity as the fracturing process only occurs through one injection opening and/or through one production opening at a time in each well. The geothermal energy extraction subterranean system further comprises a pump 50 for controlling a pressure of the fracturing fluid and of the working fluid in the first well tubular metal structure. Thus, the pump controls the velocity of the working fluid flowing in the subterranean system.

As can be seen in FIG. 3, the geothermal energy extraction subterranean system further comprises means 53 for regulating the flow control devices in order to selectively open or close a production zone, e.g. during fracturing but also in production so that only fluid in each production zone is heated so that only some of the production zones are in use at a time. The second well tubular metal structure comprises a screen 54 configured to filtrate the heated working fluid before the heated working fluid enters the second well tubular metal structure 9. The means 53 may be a self-propelling driving unit and may also be used for sliding a sleeve 61 (shown in FIG. 9) for uncovering the injection opening 7 and/or the production opening 12.

Figure 6:
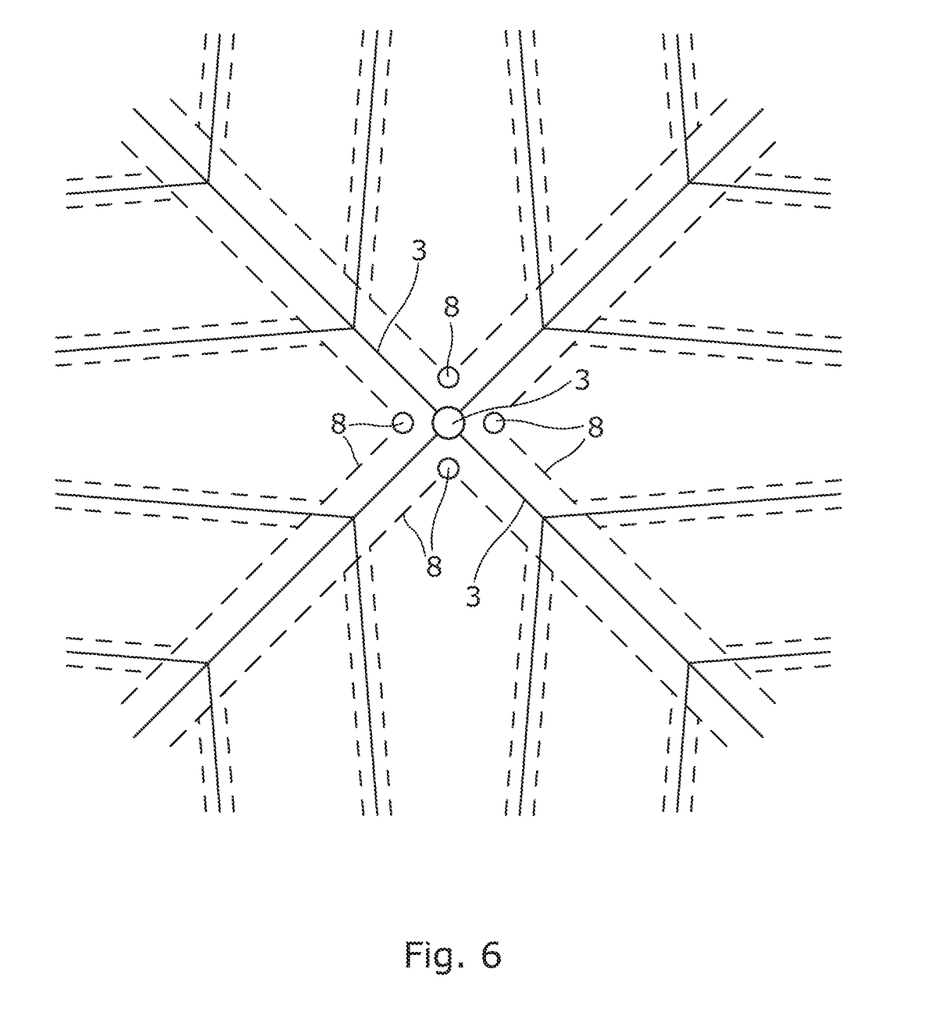
FIG. 6 shows a diagram view of a geothermal energy extraction subterranean system seen from above illustrating the injection well and the production wells.

The injection well 3 and the production wells 8 may further comprise several laterals 16 at different positions along an extension of the first well tubular metal structure and the second well tubular metal structure as shown in FIG. 6. The production wells 8 are illustrated with dotted lines and the injection well 3 is illustrated with solid lines. The injection well 3 and the production wells 8 may further comprise several laterals 16 at different positions along the vertical extension of the wells, as shown in FIG. 5.

Figure 9:
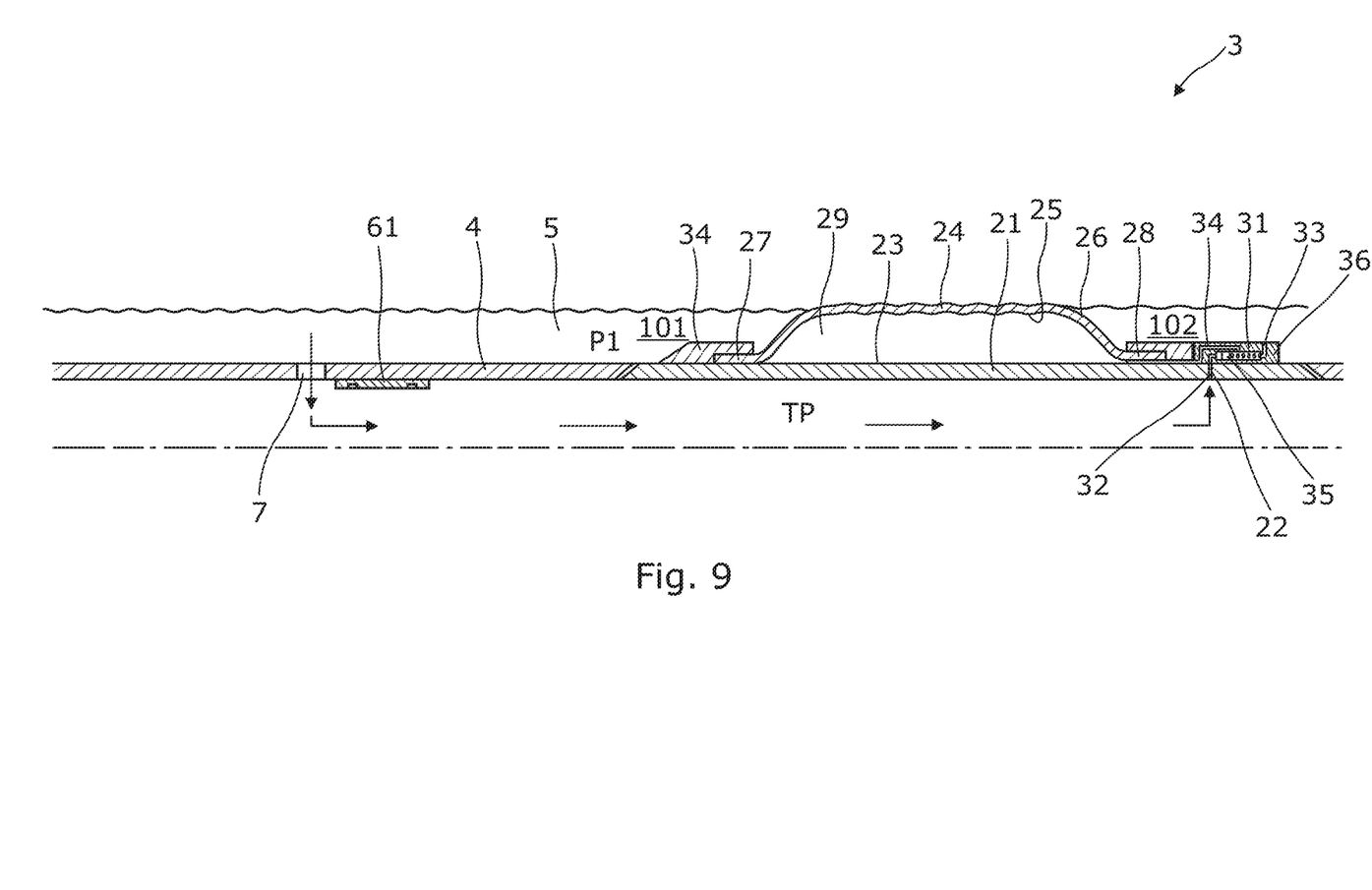
FIG. 9 shows a cross-sectional view of an annular barrier.
Figure 10:
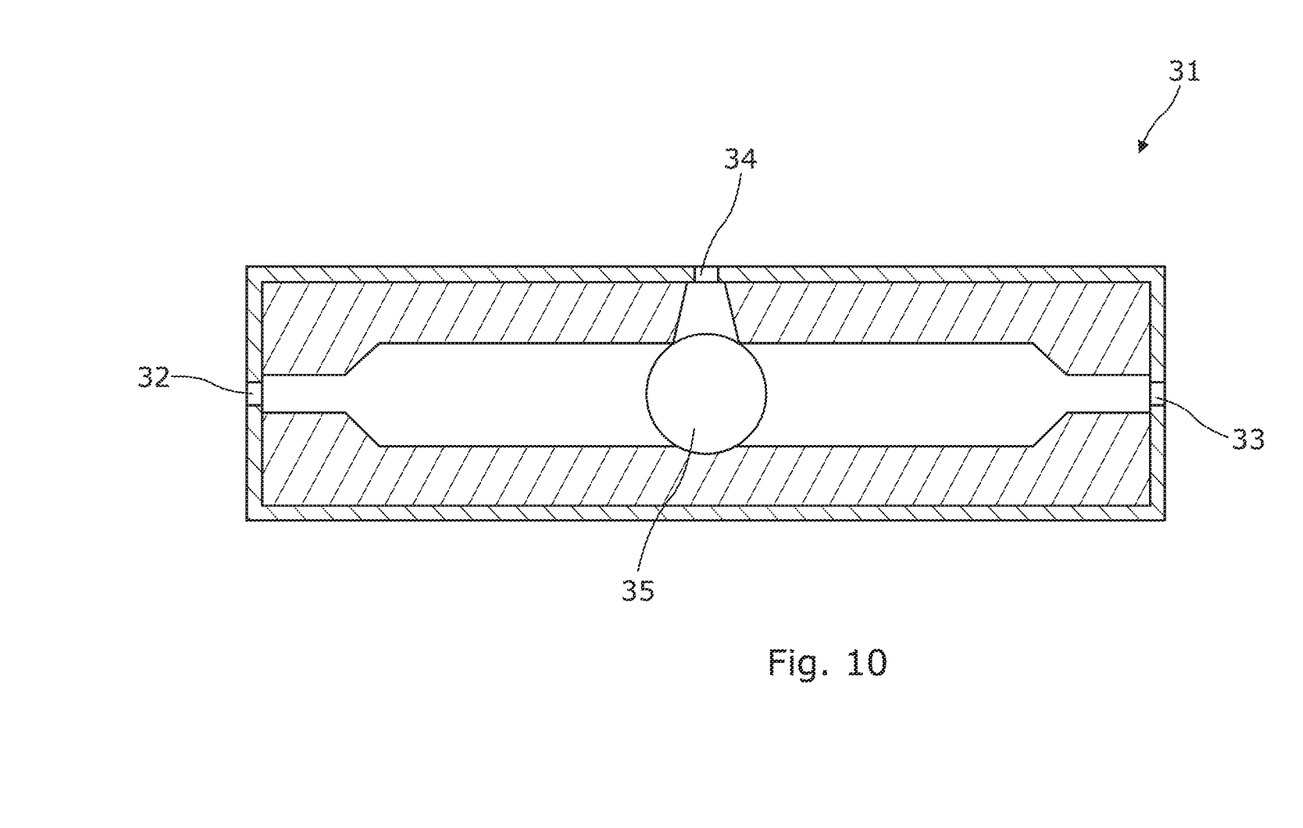
FIG. 10 shows a cross-sectional view of an expansion unit of an annular barrier.

The annular barrier may comprise a valve 36 in fluid communication with the expansion opening 22, as shown in FIG. 9. The valve 36 may be a two-vay valve or a three-way valve. When expanding the annular barrier, the valve 36 provides fluid communication from the well tubular metal structure and the space 29 and which provides fluid communication between the space and the annulus after expansion. When expanding the annular barriers by pressurising the well tubular metal structure, the opening 7 is closed in that the sleeve 61 is slid to cover the opening. The sleeve 61 is slid to the shown position where the sleeve no longer covers the opening before fracturing occurs. When fracturing the formation, the pressure in the annulus confined by the annular barriers may be higher than the pressure in the space 29 and the annular barrier comprises an expansion unit 31 comprising the valve. The expansion unit 31 has a first inlet 32 in fluid communication with the expansion opening, a second inlet 33 in fluid communication with the first zone and an outlet 34 in fluid communication with the annular space. The expansion unit 31 of FIGS. 9 and 10 comprises an element 35 movable at least between a first position and a second position. In the first position the expansion opening is in fluid communication with the outlet and the tubular pressure is higher than the first pressure, and in the second position the outlet is in fluid communication with the first production zone 101 and the first pressure P1 is higher than the tubular pressure TP. The expansion unit 31 may comprise a shuttle valve, as shown in FIG. 10, where the element 35 is comprised in the shuttle valve.

Heat is extracted from a subterranean formation in order to provide heat to e.g. buildings or to transform the heat into another energy form such as electricity. Heat is extracted from the subterranean formation by means of the geothermal energy extraction subterranean system by pressurising the first well tubular metal structure of the injection well to expand the annular barriers and thereby provide isolated zones. Then fluid communication through an injection opening in the first well tubular metal structure is provided, e.g. by opening a valve or by perforating the well tubular metal structure by means of a perforation gun. The production zone is then fractured by pressurising the first well tubular metal structure, e.g. by means of fracturing fluid comprising proppants which enters and remains in the created fractures to keep the fractures open. Subsequently, working fluid is introduced into the first well tubular metal structure of the injection well and further into the production zone. After passing the production zone, the heated working fluid is extracted from the production zone.

In the system in which the second well tubular metal structure comprises annular barriers, the second well tubular metal structure is also pressurised in order to expand annular barriers.

In order to decrease the fracturing pressure even further, the production zone may also be fractured from the production well by pressurising fluid in the second well tubular metal structure. Before initiating the fracturing process from the production well, the fracturing process from the first well tubular metal structure may be stopped during the fracturing from the second well tubular metal structure so that when a pressure difference in the injection well is detected, the fractures extend across the production zones and the fracturing process can be terminated.

When having several production zones and after fracturing the first production zone, the first injection opening is closed and a second injection opening is opened and fracturing through the second injection opening is initiated.

Figure 7:
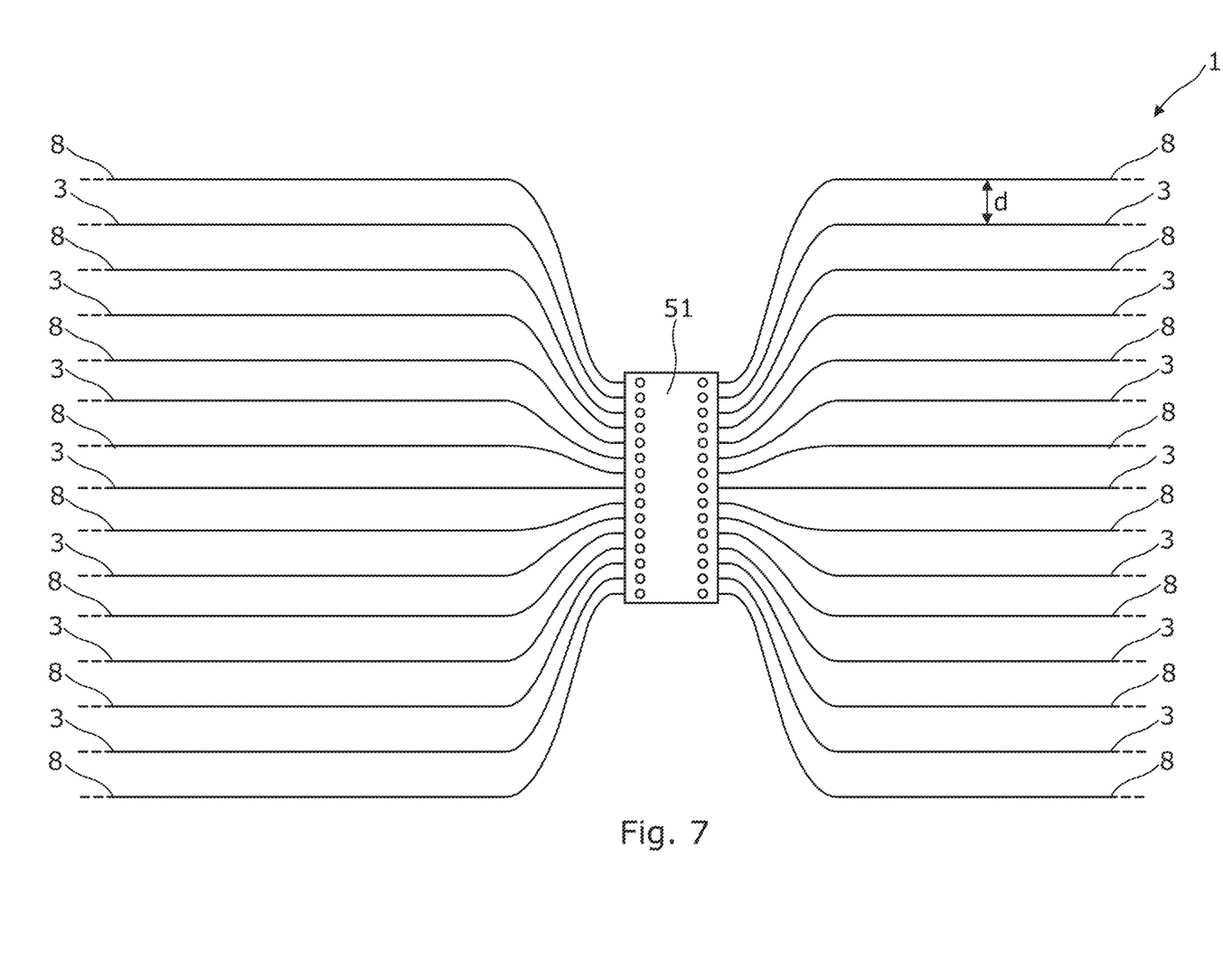
FIG. 7 shows a diagram view of another geothermal energy extraction subterranean system seen from above illustrating both injection wells and production wells.

The geothermal energy extraction subterranean system 1 of FIG. 7 comprises several injection wells 3 and several production wells 8 arranged in parallel and extending from the plant 51 and out into the subterranean formation. The plant is a district heating system 51a (shown in FIG. 1) for distributing heated fluid to end users and/or a heat to electricity generating plant 51b (shown in FIG. 2) for transforming heat into electricity. The wells all extend from the plant 51 and out into the formation and can thus be made very long and cover a very large production area compared to FIG. 1. The wells can be made in the same horizontal plane and be drilled perpendicularly to the maximal stress plane so that the fractures are created perpendicularly to the extension of the wells, and thus the fractures are created in the maximal stress plane, which results in more controlled fracturing. By designing the geothermal energy extraction subterranean system so that the horizontal parts of the wells are made in the same vertical level and thus the same plane, the fractures are made in the same type of formation layer and thus the fractures can be made in a more controlled manner as the energy required to create the fractures will be approximately the same. Furthermore, the system design of having all wells extending from the plant makes it possible to cover 1,000 km$^2$ of formation, creating a geothermal energy extraction subterranean system with a very large capacity without having a very large plant 51. The production wells are arranged having an injection well therebetween and with the same mutual distance d.

Figure 8:
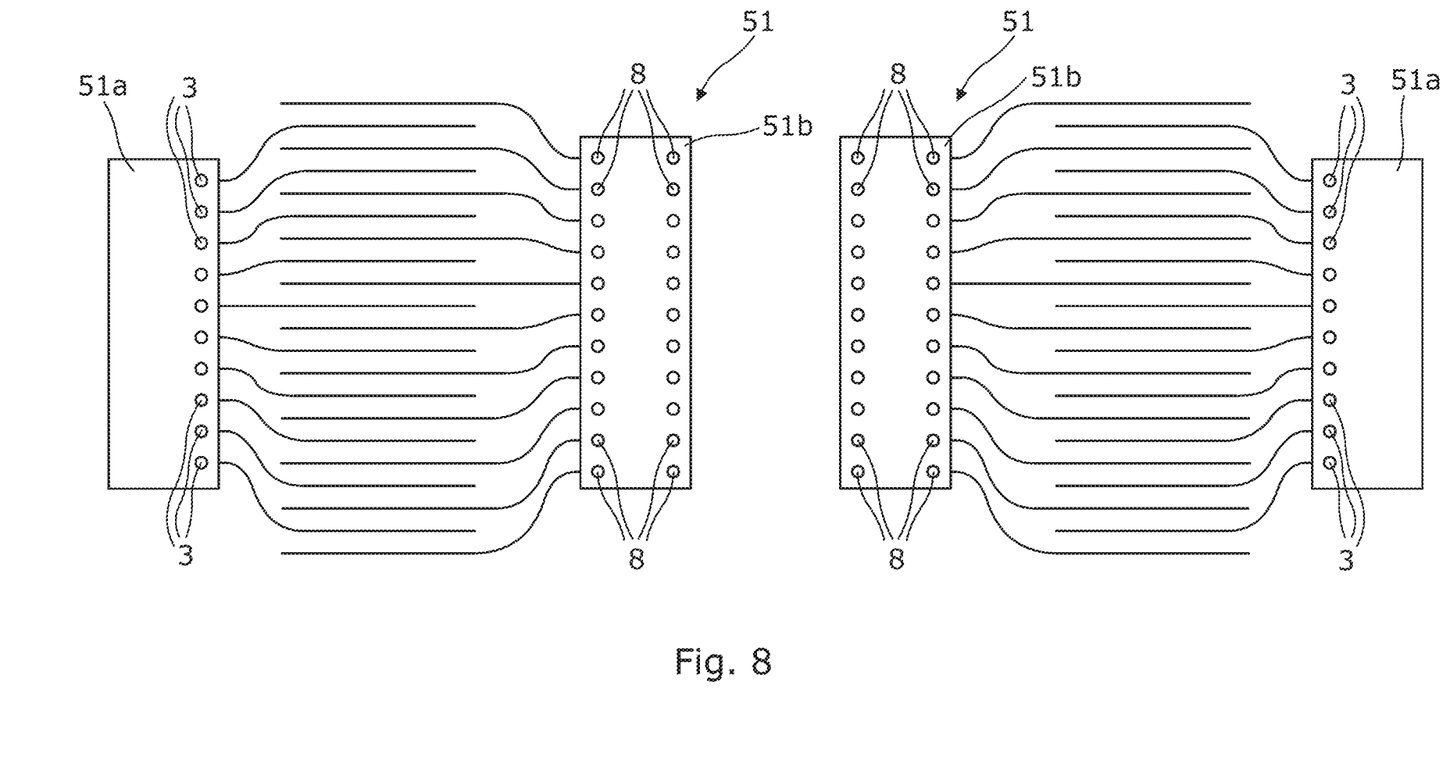
FIG. 8 shows a diagram view of another geothermal energy extraction subterranean system seen from above illustrating both injection wells and production wells.

In FIG. 8, the geothermal energy extraction subterranean system comprises two injection plants 51c and a production plant 51 therebetween, so that the injection occurs remote from the production, and the non-heated working fluid is transported to the injection plants but the heated working fluid is extracted at the same plant where it is transformed into electricity or distributed to end users.

By a well tubular metal structure is meant any kind of pipe, tubing, tubular, liner, string of metal etc. used subterraneously for geothermal energy extraction subterranean production.

Although the invention has been described in the above in connection with preferred embodiments of the invention, it will be evident for a person skilled in the art that several modifications are conceivable without departing from the invention as defined by the following claims.

The invention claimed is:

1. A geothermal energy extraction subterranean system for extracting heat from a subterranean formation, comprising:
    an injection well comprising a first well tubular metal structure arranged in a first borehole providing a first annulus therebetween and extending from surface into the subterranean formation and being configured to inject a working fluid out through a first injection opening into a production area defined in the subterranean formation and thereby generating a heated working fluid, and
    a first production well comprising a second well tubular metal structure arranged in a second borehole providing a second annulus therebetween and extending from surface into the subterranean formation into the production area and extracting the heated working fluid through a first production opening,
    wherein the first well tubular metal structure of the injection well comprises a first annular barrier and a second annular barrier configured to expand in the first annulus to directly abut a wall of the first borehole to isolate a production zone in the production area, each annular barrier comprising:
        a tubular metal part mounted as part of the first well tubular metal structure, the tubular metal part having a first expansion opening and an outer face,
        an expandable metal sleeve surrounding the tubular metal part and having an inner face facing the tubular metal part and an outer face facing the wall of the borehole, each end of the expandable metal sleeve being connected with the tubular metal part, and
        an annular space between the inner face of the expandable metal sleeve and the tubular metal part, the expandable metal sleeve being expanded and plastically and permanently deformed to directly contact the wall of the first borehole by entering pressurised fluid into the annular space through the first expansion opening,
    the first injection opening being arranged in the first well tubular metal structure between the first annular barrier and the second annular barrier, and the production zone being arranged between the first well tubular metal structure and the second well tubular metal structure, so that the heated working fluid is extracted in the second well tubular metal structure through the first production opening.

2. A geothermal energy extraction subterranean system according to claim 1, wherein the second well tubular metal structure comprises a first annular barrier and a second annular barrier.

3. A geothermal energy extraction subterranean system according to claim 1, comprising a second production well having a second well tubular metal structure and a first production opening.

4. A geothermal energy extraction subterranean system according to claim 1, wherein the first well tubular metal structure comprises additional annular barriers isolating a second production zone in the production area.

5. A geothermal energy extraction subterranean system according to claim 1, wherein the injection well and the production well have a vertical part and a horizontal part.

6. A geothermal energy extraction subterranean system according to claim 1, wherein the first well tubular metal structure and/or the second well tubular metal structure comprises at least one sleeve.

7. A geothermal energy extraction subterranean system according to claim 1, further comprising a pump controlling a pressure of the working fluid in the first well tubular metal structure.

8. A geothermal energy extraction subterranean system according to claim 6, further comprising means for regulating the at least one sleeve in order to selectively heat fluid in each production zone so that only a part of the production area is in use at a time.

9. A geothermal energy extraction subterranean system according to claim 1, wherein the injection well and/or the production well further comprise(s) one or more laterals extending from a main part of the well, the lateral comprising a lateral well tubular metal structure fluidly connected with the well tubular metal structure in the main part of the well.

10. A geothermal energy extraction subterranean system according to claim 1, wherein the system comprises the injection well and several production wells surrounding the injection well.

11. A geothermal energy extraction subterranean method for extracting heat from a subterranean formation by means of the geothermal energy extraction subterranean system according to claim 1, comprising:
pressurising the first well tubular metal structure of the injection well to plastically and permanently expand the annular barriers into direct contact with the wall of the first borehole,
providing fluid communication through the injection opening in the first well tubular metal structure,
fracturing the production zone by pressurising fluid, such as a fluid present in the first well tubular metal structure or a fracturing fluid, in the first well tubular metal structure,
introducing working fluid into the first well tubular metal structure of the injection well and further into the production zone, and
extracting heated working fluid from the production zone.

12. A geothermal energy extraction subterranean method according to claim 11, wherein, before providing fluid communication through the injection opening in the first well tubular metal structure, the first well tubular metal structure is perforated providing the injection opening.

13. A geothermal energy extraction subterranean method according to claim 11, wherein, before providing fluid communication through the injection opening in the first well tubular metal structure, the injection opening is opened, e.g. by sliding a sliding sleeve away from covering the injection opening.

14. A geothermal energy extraction subterranean method according to claim 11, wherein the second well tubular metal structure comprises a first annular barrier and a second annular barrier, and wherein the method further comprises pressurising the second well tubular metal structure in order to expand the annular barriers of the second well tubular metal structure.

15. A geothermal energy extraction subterranean method according to claim 11, wherein, before pressurising the second well tubular metal structure in order to expand the annular barriers, the second well tubular metal structure is perforated providing a production opening.

16. A geothermal energy extraction subterranean method according to claim 11, wherein, before pressurising the second well tubular metal structure in order to expand the annular barriers, a production opening of the second well tubular metal structure is opened, e.g. by sliding a sliding sleeve away from covering the production opening.

17. A geothermal energy extraction subterranean method according to claim 11, further comprising fracturing the production zone by pressurising fluid in the second well tubular metal structure.

18. A geothermal energy extraction subterranean method according to claim 17, further comprising stopping fracturing the production zone from the first well tubular metal structure during the fracturing from the second well tubular metal structure.

19. A geothermal energy extraction subterranean method according to claim 18, further comprising detecting a pressure difference in the first well tubular metal structure during fracturing of the production zone from the second well tubular metal structure.

20. A geothermal energy extraction subterranean system according to claim 1, wherein each said expandable sleeve is not configured to deflate and not configured to re-expand.

* * * * *